(12) United States Patent
Labelle et al.

(10) Patent No.: US 7,539,402 B2
(45) Date of Patent: May 26, 2009

(54) ELECTRICAL LIQUID-HEATING APPLIANCE

(75) Inventors: Guy Labelle, Champfleur (FR); Jean-Pierre Binot, St. Ouen de Mimbre (FR)

(73) Assignee: SEB S.A., Ecully (FR)

( * ) Notice: Subject to any disclaimer, the term of this patent is extended or adjusted under 35 U.S.C. 154(b) by 429 days.

(21) Appl. No.: 11/547,140

(22) PCT Filed: Mar. 17, 2005

(86) PCT No.: PCT/FR2005/000660

§ 371 (c)(1),
(2), (4) Date: Nov. 30, 2006

(87) PCT Pub. No.: WO2005/099533

PCT Pub. Date: Oct. 27, 2005

(65) Prior Publication Data

US 2008/0317449 A1    Dec. 25, 2008

(30) Foreign Application Priority Data

Apr. 7, 2004  (FR) ................................. 04 03660

(51) Int. Cl.
*A01K 63/06*  (2006.01)
*F24H 1/18*  (2006.01)

(52) U.S. Cl. ...................... 392/444; 392/498; 219/441

(58) Field of Classification Search ................. 392/444; 219/441

See application file for complete search history.

(56) References Cited

U.S. PATENT DOCUMENTS

| 3,026,402 | A | * | 3/1962  | Russell ........................ 219/441 |
| 3,784,788 | A | * | 1/1974  | Fourny ........................ 219/441 |
| 4,360,726 | A | * | 11/1982 | Haden ......................... 219/441 |
| 4,430,556 | A | * | 2/1984  | Inskip et al. ................. 392/447 |
| 4,455,476 | A | * | 6/1984  | Haden ......................... 392/447 |
| 4,510,375 | A | * | 4/1985  | Inskip et al. ................. 392/447 |
| 4,544,830 | A | * | 10/1985 | Miller ......................... 392/447 |
| 7,257,321 | B2 | * | 8/2007 | Kaastra ........................ 392/459 |

FOREIGN PATENT DOCUMENTS

DE    198 60 931    7/2000
EP    0 332 445    9/1989

* cited by examiner

*Primary Examiner*—Thor S Campbell
(74) *Attorney, Agent, or Firm*—Young & Thompson

(57) ABSTRACT

An electrical household liquid-heating appliance includes a housing (10), electrical heating elements, a switch, a button (16) pivotable about an axis between an on position and an off position and having an actuation surface, and a switch actuation lever (28) movable between an operative position in which the switch is closed and an inoperative position in which the switch is open. The button (16) is biased into a so-called neutral intermediate position by a resilient member.

10 Claims, 2 Drawing Sheets

ELECTRICAL LIQUID-HEATING APPLIANCE

Figure 1:
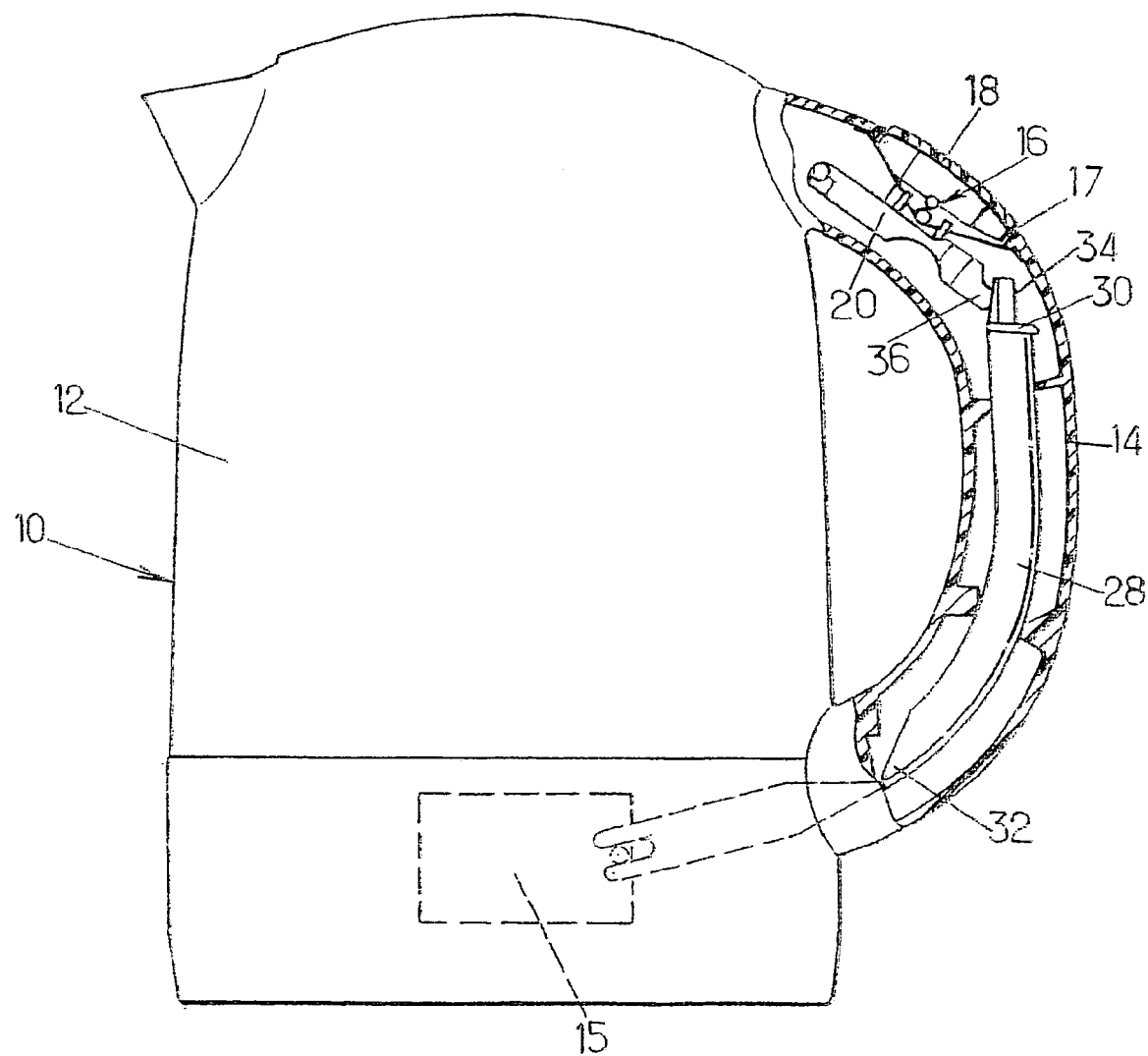

The present invention relates to electrical apparatus for heating liquid, such as for example an electric kettle.

More particularly, the invention relates to an electric apparatus for heating liquid comprising a housing, electrical heating means, a switch for triggering electrical heating means, a button which is arranged in an opening provided in the housing, and which has an actuating surface and a finger secured to each other, the button being swingably mounted about an axis, between an on position and an off position, and an actuating lever for the switch having a first end connected to the finger and a second end connected to the switch, the lever being movable between an active position in which the switch is closed and an inactive position in which the switch is open, the lever being disposed in active position by swinging of the button to the on position and to the inactive position by swinging of the button to the off position.

At present, apparatus of this type, such as kettles, have swingable buttons which project from the housing when they are in the on and/or off position. The buttons can thus have problems of sealing against dirt and liquid. Moreover, foreign bodies can lodge behind the button, thereby preventing its swinging toward the off or on position.

The present invention has particularly for its object to overcome these drawbacks.

To this end, according to the invention, an electric apparatus of the type in question is characterized in that the button is returned by at least one resilient member into an intermediate so-called neutral position, between the on position and the off position, and in that the connection between the first end of the lever and the finger is a loose connection adapted to permit free swinging of the button between the on position and the neutral position when the lever is in its active position, and free swinging of the button between the off position and the neutral position when the lever is in its inactive position.

Thanks to these arrangements, the button always returns to the neutral position after actuation to the start or stop position, the actuating lever remaining in active or inactive position. As a result, in addition to any actuation, the button remains in its neutral position, offering leveling of the actuating surface of the button with the opening of the housing in which it is mounted; this permits improving the sealing between the button and the housing, as well as safety of operation of the apparatus by avoiding any undesirable actuation of the button. Moreover, such a construction has a desirable appearance. Moreover, the free clearance between the button and the lever permits passage, for example triggered by a thermostatic cutoff, of the lever from the active position toward the inactive position, even if the button is blocked in the neutral position by a foreign body.

In various embodiments of the electric household apparatus according to the invention, there can if desired be used one and/or the other of the following arrangements:

- the actuating surface of the button, in its neutral position, is flush with the housing;
- the first end of the lever comprises a window in which the finger is movable, the length of the window being at least equal to the amplitude of the clearance of the finger from the neutral position toward respectively the stop and start positions, and less than the amplitude of clearance of the finger between the off position and the on position;
- the resilient return member is formed by a spring fixed on the button and having arms whose respective ends bear against the housing in the neutral position of the button;
- the housing comprises a handle provided with the opening in which is disposed the button;
- the opening and the actuating surface of the button are of oblong shape, and the swinging axis is arranged in a transverse medial plane passing between the longitudinal ends of said actuating surface;
- the apparatus comprises a thermostat sensitive to the temperature of the liquid contained in the enclosure, said thermostat comprising control means adapted to place the lever in the inactive position when the temperature measured by the thermostat is greater than a threshold value;
- the control means comprise a sensor adapted to come into contact between an electrical supply base of the apparatus and adapted to place the lever in the inactive position when the apparatus is not in place on the supply base;
- the apparatus is constituted by a kettle.

Other characteristics and advantages of the invention will become apparent from the following description of one of its modes of embodiment, given by way of non-limiting example, with respect to the attached drawings.

Figure 2:
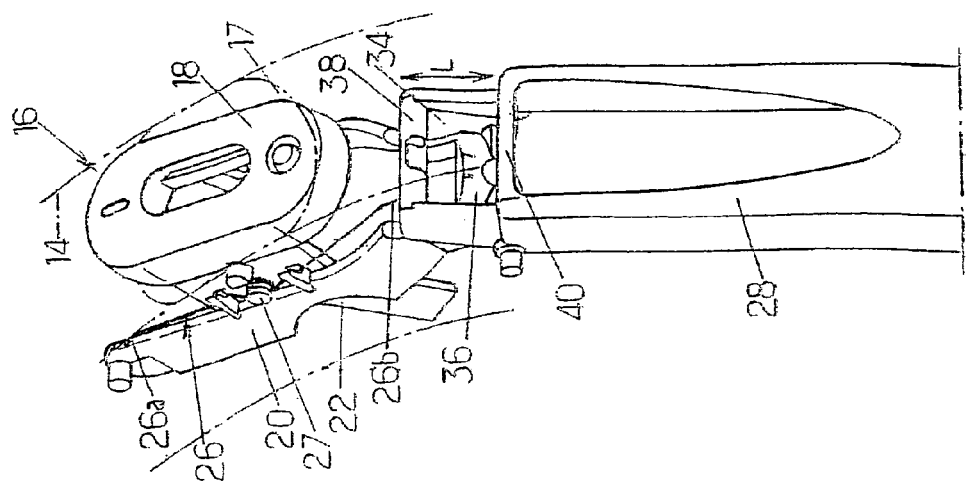
Figure 3:
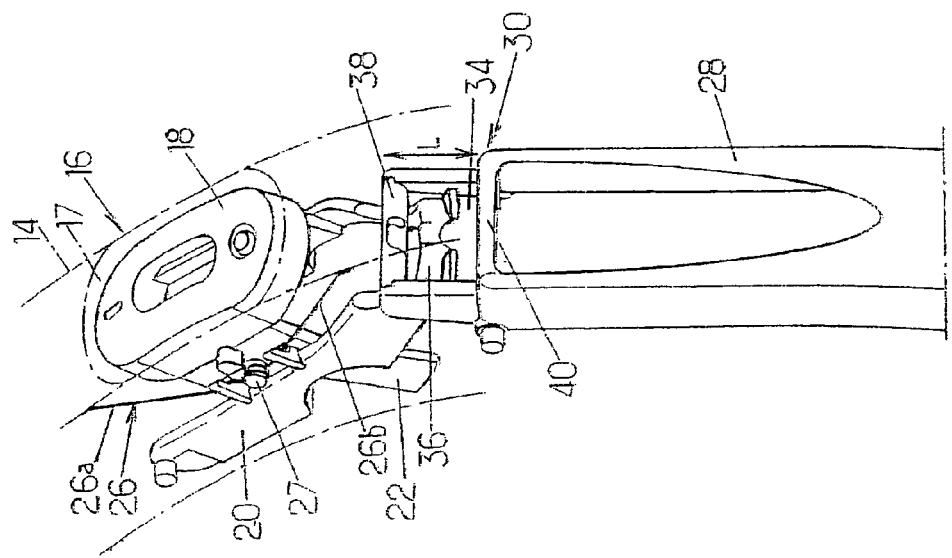
Figure 4:
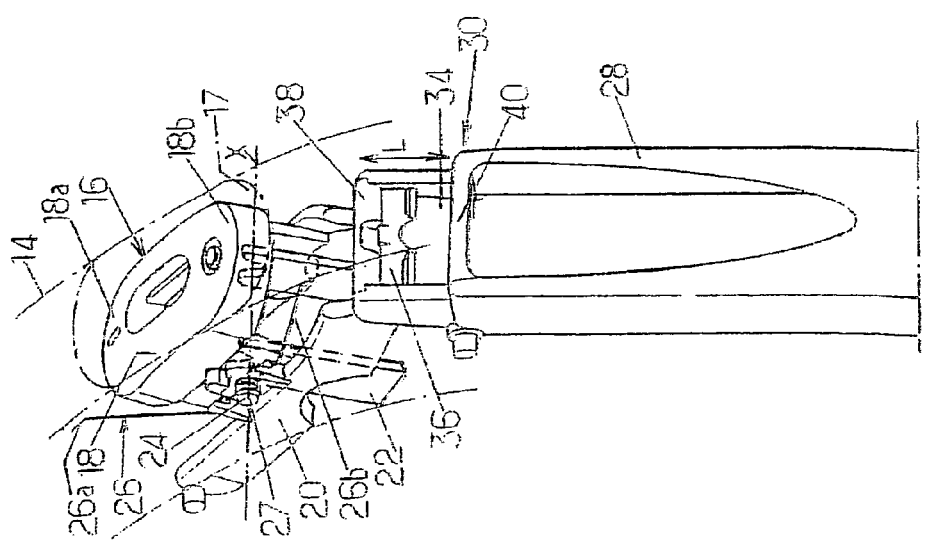

FIG. 1 shows a schematic view of an apparatus according to the invention, showing the button mechanism within a handle of the electrical apparatus, FIG. 2 is a simplified perspective view of the button in the on position, FIG. 3 is a view similar to FIG. 2 in which the button is in neutral position, FIG. 4 is a view similar to FIG. 2 in which the button is the off position.

In the different figures, the same reference numerals designated identical or similar elements.

FIG. 1 is a view of an apparatus according to the invention, here shown by an electric kettle. This kettle comprises a housing 10 which comprises a chamber 12 adapted to be filled with the liquid to be heated and a handle 14 permitting the user to grasp the kettle and to pour the liquid. So as to heat the liquid, the kettle comprises electrical heating means such as an electric resistance connected to a switch 15 for its supply of the electricity. The switch 15 comprises an electrical outlet provided for supplying the heating means and is connected to an electrical source.

The kettle also comprises a button 16 which is arranged in an opening 17 provided in the handle 14, and which has an actuating surface 18 on which the user can act to actuate the switch, so as to heat the liquid or turn off the kettle. As shown in FIGS. 2, 3 and 4, the actuating surface 18 of the button 16 has a substantially oblong shape, which extends between two ends 18a, 18b; the opening 17 also has an oblong shape. The button 16 also comprises a finger 20 which is secured to its actuating surface 18, and which is disposed in a plane substantially parallel to that formed by the actuating surface 18. The button 16 is mounted swingably about an axis X disposed in a transverse medial plane passing between the longitudinal ends 18a, 18b of the actuating surface 18 of the button 16. This button 16 swings between an on position in which it closes the switch 15 and an off position in which it opens the switch 15 to de-actuate a heating. This button swings on a support 22 having one end of U shape on which two lugs located on the interior surface of the button bear.

The button 16 moreover comprises resilient return means 26 which return it to be an intermediate so-called neutral position. These resilient means are formed by a spring 26 comprised by two arms 26a, 26b disposed in a V, and whose respective ends bear on the housing 10 in their rest position which corresponds to the neutral position of the button 16. The spring 26 permits returning the button 16 into its neutral position between the on position and the off position. The spring 26 is fixed on the button 16 about a pivot 27 whose axis is substantially parallel to the swinging axis X of said button 16.

An actuating lever 28 is disposed between the button 16 and the switch 15. It has a first end 30 connected to the finger 20 of the button and a second end 32 connected to the switch. Under the action the swinging button 16, the lever 28 is driven with a movement of translation in the direction of the switch. The second end 32 of the lever acts on the mechanical output of the switch 15. Thus, the movement of the lever 28 triggers the opening or closing of the switch 15.

As shown in FIGS. 2, 3 and 4, the first end 30 of the lever 28 connected to the finger 20 of the button 16, has a window 34 in which a portion 36 of the finger 20 is movable. This window 34 has an upper edge 38 and a lower edge 40 separated by a length L. The length L of this window is less than the swinging amplitude of the finger 20 between the off position and the on position. The amplitude of swinging of the finger 20 is equal to the shortest distance connecting the two ends of the arc of a circle described by the finger 20 between the off position and the on position. Thus the button 16 moves the lever 28, by bearing on the lower edge 40 or on the upper edge 38, toward an inactive position and toward an active position, respectively. However, the length L of the window 34 is at least equal to the maximum amplitude of the clearances of the finger 20 from the neutral position toward respectively the on and off positions. In the illustrated example, each of these clearances has a substantially equal amplitude.

The three positions of the button 16 are shown in FIGS. 2, 3 and 4 in which FIG. 2 shows the button 16 in its on position in which the button has swung toward the first end 18a of its actuating surface. FIG. 3 shows the button in its neutral position. And FIG. 4 shows the button in its off position in which the button has swung toward the second end 18b of its actuating surface. The ends each have a marking indicating to the user on which end he should press to start or stop heating. The button 16 swings between these three positions and the portion 36 of the finger 20 inserted in the window 34 describes the arc of a circle whose length depends on the swinging of the button, which is to say on its angle of rotation relative to its initial position.

In the neutral position, the portion 36 of the finger 20 of the button floats in its window 34 of the actuating lever 28 as shown in FIG. 3. The button 16 is thus held in equilibrium thanks to the spring 26 whose ends of the arms 26a, 26b each bear on the housing 10.

The invention operates as described below.

To start the kettle, the user presses on the first end 18a of the actuating surface 18 of the button 16 and causes its swinging in a first direction. The finger 20 of the button 16 secured to the actuating surface 18 is thus driven in this first direction of swinging and moves in the window 34 of the actuating lever 28. Given that the length L of the window 34 is less than the amplitude of clearance of the finger 20 between the off and on positions, the finger 20 thus bears on the upper edge 38 of the window 34 during its swinging and drives the lever 28 until the end of the path of the swinging of the button. The lever 28 is thus moved toward its active position, and if desired beyond, and acts on the switch so it will be in the closed position and permits the passage of the current to supply the electrical heating means so as to heat the liquid within the chamber 12.

When the user bears on the second end 18b of the actuating surface 18, the button 16 swings in a second direction opposite to the first direction and the portion 36 of the finger 20 of the button 16 then describes an arc of a circle in the window 34 of the lever 28. During its movement, the portion of the finger 20 bears on the lower edge 40 of the window 34 and thus exerts on it a bearing force to move the actuating lever 28 toward its inactive position. The actuating lever 28 thus acts on the switch to place it in the open position and stops the electrical supply for the electrical heating means of the kettle.

When the button 16 is in its on or off position, the arms 26a, 26b of the spring 26 are thus stressed between their point of securement to the button 16 and their point of contact with the housing 10. The spring 26 tends to return to its equilibrium position and hence to return the button 16 to its neutral position. The neutral position is rendered possible thanks to the window 34 of the lever 28 in which the portion 36 of the finger 20 of the button 16 can swing. The button 16 is thus held in neutral position only thanks to the arms 26a, 26b of the spring 26, each arm end being in bearing relation against the housing 10. The portion 36 of the finger 20 thus floats in the window 34 of the actuating lever 28 because the length L of the window 34 is at least equal to the amplitude of swinging of the finger 20 from its neutral position toward its on position or its off position. The connection between the lever 28 and the finger 20 is thus a loose connection adapted to permit free clearance of the button 16 between the on position and the neutral position when the lever 28 is in an active position.

Similarly, when the button 16 is in the off position, one of the arms 26a of the spring 26 is stressed by the swinging of the button, and tends to return it to the equilibrium position. The spring 26 drives during its retreat the swinging of the button 16 to return it to the neutral position. The portion 36 of the finger 20 remains floating in the window 34 of the actuating lever 28 in the neutral position.

In the neutral position, the actuating surface 18 of the button 16 is flush with the handle 14 of the kettle as shown in FIG. 1. The actuating surface 18 of the button 16 has a curvature which gives to the button 16 the same level as the surface of the handle 14. The neutral position permits improving the sealing of the button 16, because in neutral position the button 16 fills practically all the opening 17 of the handle 14. This sealing ensures least penetration of dirt or a liquid. Moreover, this neutral position of the button gives the user a more pleasing appearance and more security because the button 16 does not extend beyond the surface of the handle 14, and avoids any undesirable actuation of the button.

The kettle also comprises a thermostat, not shown, sensitive to the temperature of the liquid. This thermostat is in communication with the chamber and is connected to control means adapted automatically to place the lever 28 in inactive position when the temperature measured by the thermostat is greater than a predetermined threshold value and thus to trigger the switch to the open position. When the lever 28 is in the active position, and the water is heated, the button 16 is in its neutral position, as described above. When the lever 28 is returned from its active position toward its inactive position by the control means, the button 16 remains in the neutral position during automatic stopping of heating of the water, because the length L of the window of the lever is at least equal to the amplitude of clearance of the finger from the one position toward the neutral position.

According to another modified embodiment, the kettle is mounted on an electrical supply base. The control means comprise a sensor adapted to bear against the supply base. These means are suitable to place the lever in inactive position when the kettle is not in place on its supply base. In this case, the button 16 in neutral position remains flush with the handle 14, as described above.

The invention is in no way limited to the embodiments described and shown, which are given only by way of example.

The invention claimed is:

1. Electrical apparatus for heating liquid, comprising:
a housing (10),
electrical heating means,
a switch (15) for triggering electrical heating means,
a button (16) which is arranged in an opening (17) provided in the housing (10), and which has an actuating surface (18) and a finger (20) secured to each other, the button (16) being mounted swingably about an axis (X), between an on position and an off position,
an actuating lever (28) of the switch (15) having a first end (30) connected to the finger (20) and a second end (32) connected to the switch (15), the lever (28) being movable between an active position in which the switch is closed and an inactive position in which the switch (15) is open, the lever (28) being disposed in active position by the swinging of the button (16) into the on position and into inactive position by the swinging of the button (16) to the off position, characterized in that the button (16) is returned by at least one resilient member (26) into an intermediate so-called neutral position, between the on position and the off position, and in that the connection end (30) of the lever (28) and the finger (20) is a loose connection adapted to permit free clearance of the button (16) between the on position and the neutral position when the lever (28) is in active position, and a free clearance of the button (16) between the off position and the neutral position when the lever (28) is in inactive position.

2. Apparatus according to claim 1, in which the actuating surface (18) of the button (16), in its neutral position, is flush with the housing (10).

3. Apparatus according to claim 1, in which the first end (30) of the lever (28) comprises a window (34) in which the finger (20) is movable, the length (L) of the window (34) being at least equal to the amplitude of clearance of the finger (20) from the neutral position toward respectively the on and off positions, and less than the amplitude of clearance of the finger (20) between the off position and the on position.

4. Apparatus according to claim 1, in which the resilient return member (26) is formed by a spring fixed to the button (16) and having arms (26a, 26b) whose respective ends bear against the housing (10) in the neutral position of the button (16).

5. Apparatus according to claim 1, in which the housing (10) comprises a handle (14) provided with the opening (17) in which is disposed the button (16).

6. Apparatus according to claim 1, in which the opening (17) and the actuating surface (18) of the button (16) are of oblong shape, and the swinging axis (X) is arranged in a transverse medial plane passing between the longitudinal ends (18a, 18B) of said actuating surface (18).

7. Apparatus according to claim 1, which comprises a thermostat sensitive to the temperature of the liquid contained in the chamber, said thermostat comprising control means adapted to place the lever (28) in inactive position when the temperature measured by the thermostat is higher than a threshold value.

8. Apparatus according to claim 7, in which the control means comprise a sensor adapted to bear against an electrical supply base of the apparatus and adapted to place the lever (28) in inactive position when the apparatus is not in place on the supply base.

9. Apparatus according to claim 1, which is constituted by a kettle.

10. Apparatus according to claim 2, in which the first end (30) of the lever (28) comprises a window (34) in which the finger (20) is movable, the length (L) of the window (34) being at least equal to the amplitude of clearance of the finger (20) from the neutral position toward respectively the on and off positions, and less than the amplitude of clearance of the finger (20) between the off position and the on position.

* * * * *